(12) United States Patent
Patel et al.

(10) Patent No.: US 9,584,425 B2
(45) Date of Patent: Feb. 28, 2017

(54) BANDWIDTH OPTIMIZATION USING COALESCED DUP ACKS

(71) Applicant: Brocade Communication Systems, Inc., San Jose, CA (US)

(72) Inventors: Maulik Patel, Bangalore (IN); Andy Dooley, Rogers, MN (US); Isaac Larson, Minneapolis, MN (US)

(73) Assignee: Brocade Communications Systems, Inc., San Jose, CA (US)

( * ) Notice: Subject to any disclaimer, the term of this patent is extended or adjusted under 35 U.S.C. 154(b) by 241 days.

(21) Appl. No.: 14/063,308

(22) Filed: Oct. 25, 2013

(65) Prior Publication Data

US 2015/0117200 A1    Apr. 30, 2015

Related U.S. Application Data

(60) Provisional application No. 61/867,786, filed on Aug. 20, 2013.

(51) Int. Cl.
*H04L 12/807* (2013.01)

(52) U.S. Cl.
CPC .................. *H04L 47/27* (2013.01)

(58) Field of Classification Search
CPC .................................................... H04L 47/27
USPC ............. 370/235, 236, 389, 401, 412, 466; 709/230, 232; 710/105, 315
See application file for complete search history.

(56) References Cited

U.S. PATENT DOCUMENTS

| | | | |
|---|---|---|---|
| 6,975,591 B1* | 12/2005 | Shorey et al. ............... | 370/229 |
| 7,535,913 B2* | 5/2009 | Minami et al. .............. | 370/401 |
| 2008/0037420 A1* | 2/2008 | Tang ............................ | 370/229 |
| 2009/0268747 A1* | 10/2009 | Kurata et al. ............... | 370/412 |
| 2011/0128853 A1* | 6/2011 | Nishimura ................... | 370/235 |
| 2013/0205037 A1* | 8/2013 | Biswas ........................ | 709/232 |

* cited by examiner

Primary Examiner — Parth Patel
(74) Attorney, Agent, or Firm — Blank Rome, LLP

(57) ABSTRACT

After sending M consecutive DUP ACKs, M generally being three, the TCP receiver generates DUP ACKs every N packets, with N greater than one, with the eventually transmitted DUP ACK containing SACK information. After receiving the third DUP ACK the TCP transmitter uses the positive acknowledgements provided in the SACK information in the TCP header to inflate the congestion window. With the reduced DUP ACKs from the TCP receiver to the TCP transmitter, the impact of TCP DUP ACKs on the data rate from the TCP receiver to the TCP transmitter is substantially reduced.

12 Claims, 15 Drawing Sheets

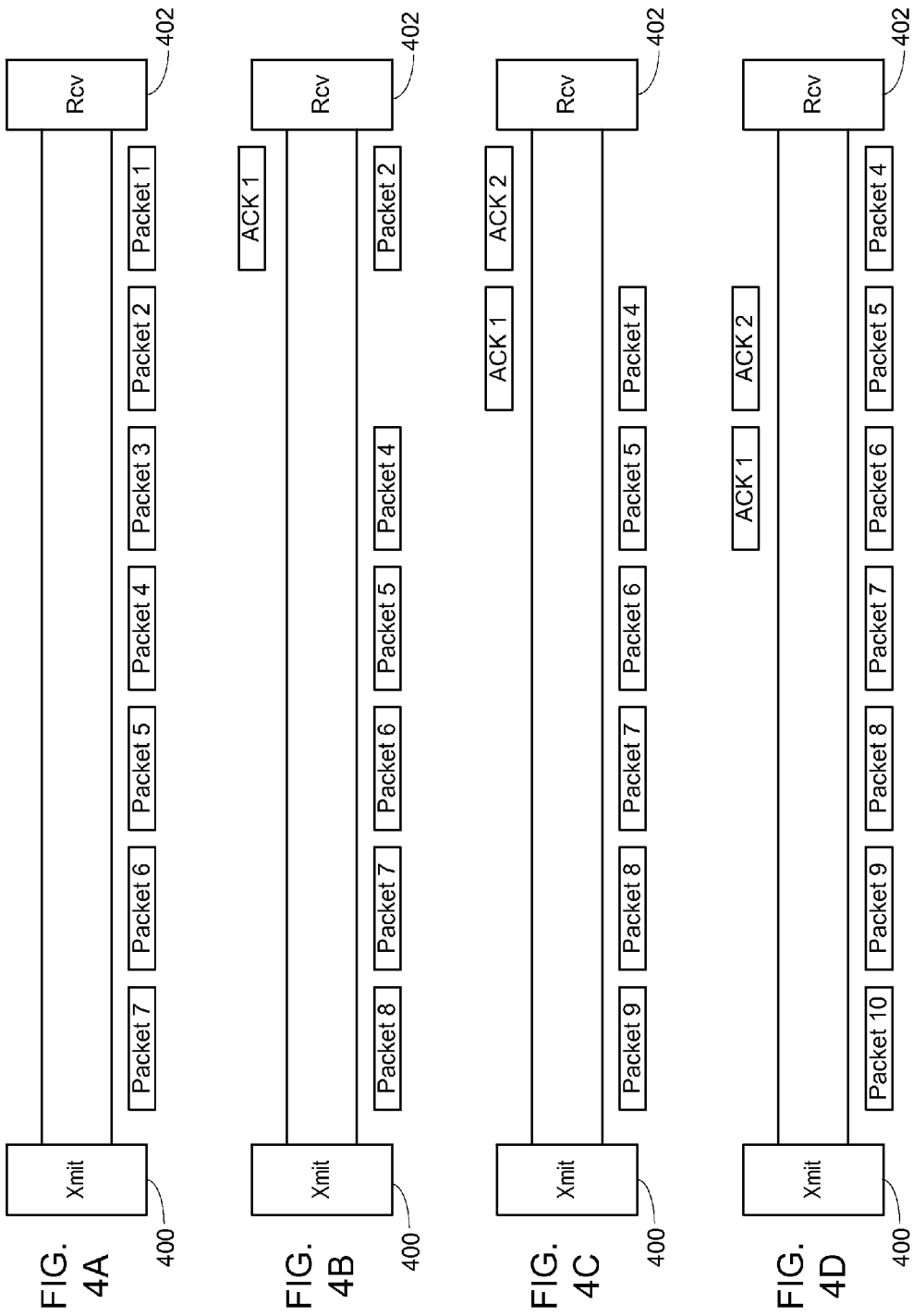

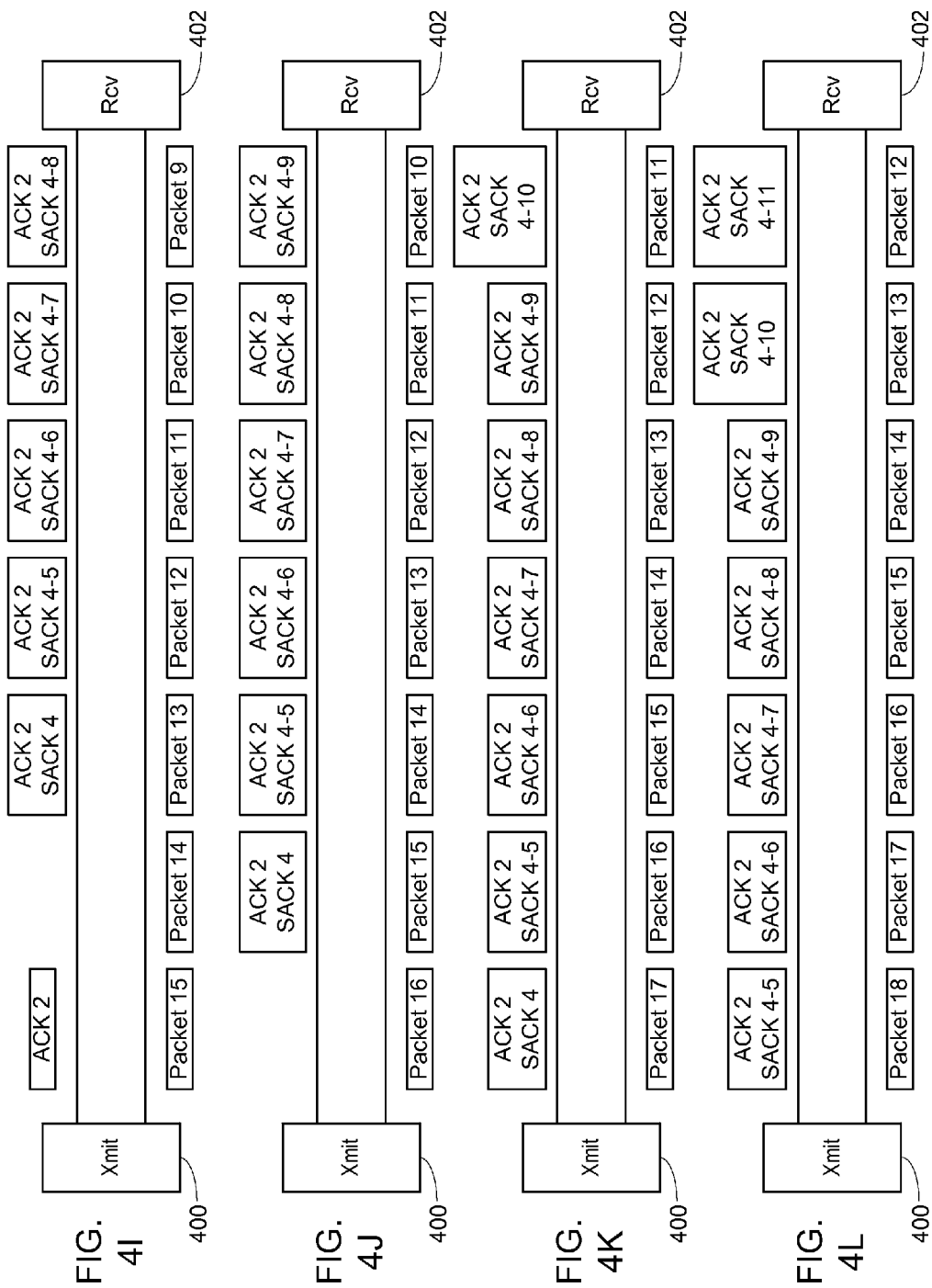

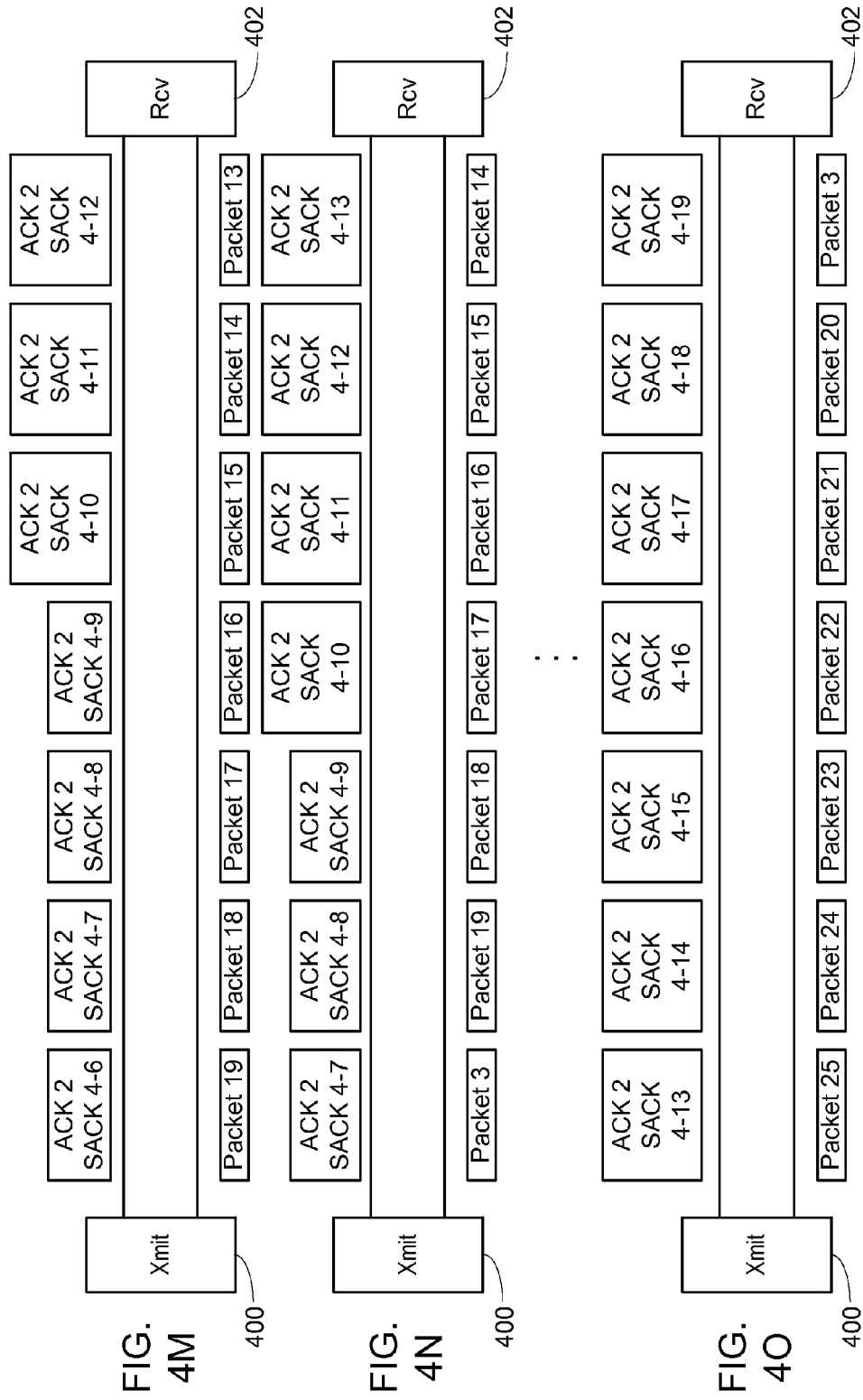

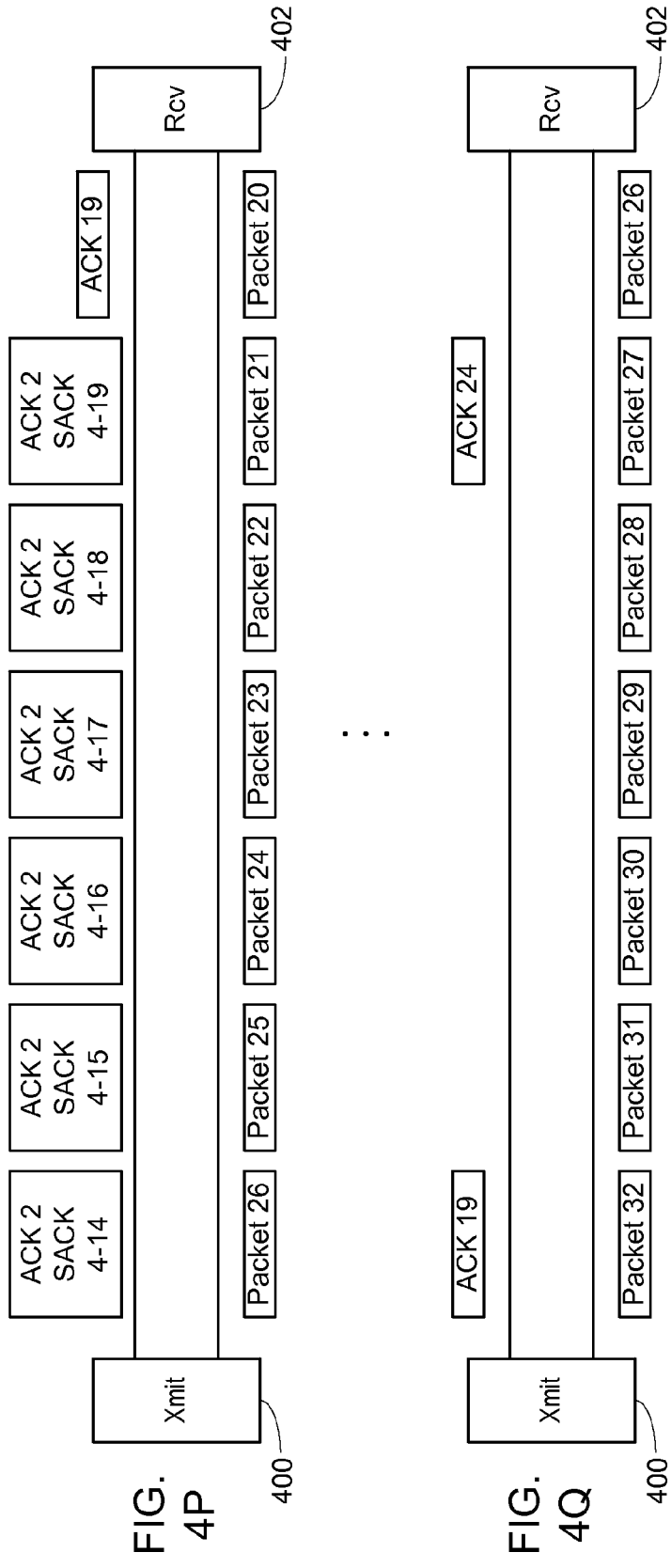

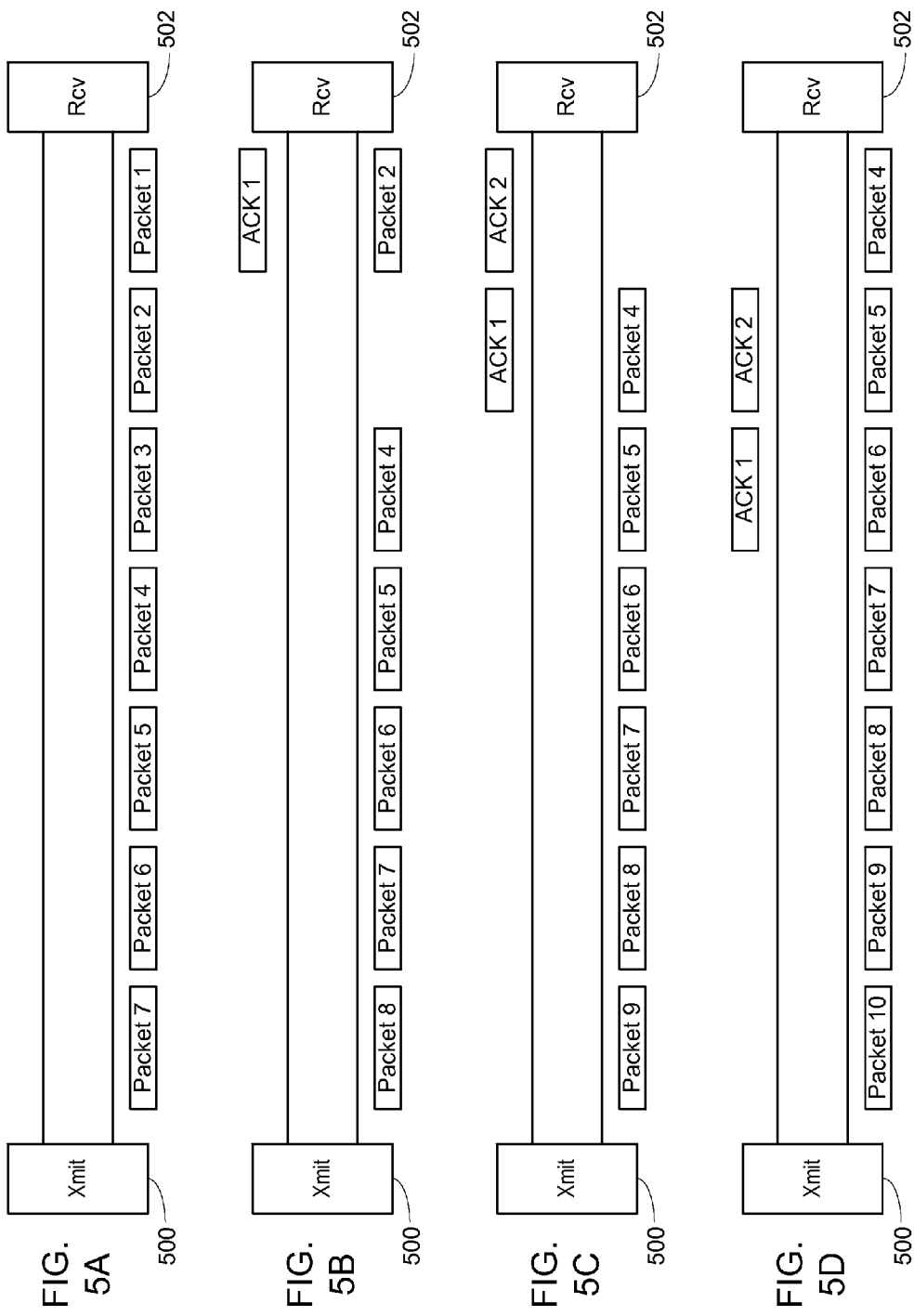

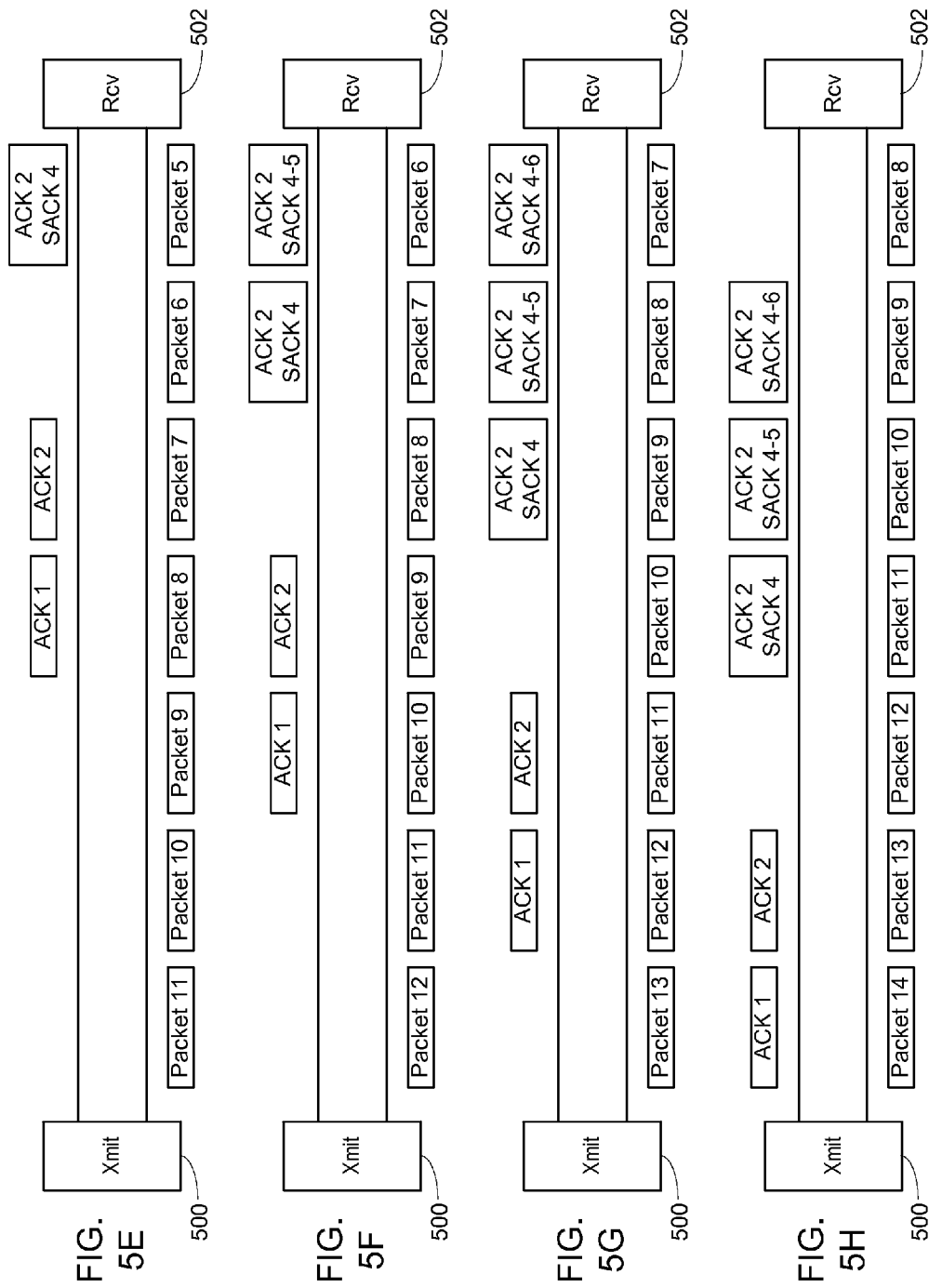

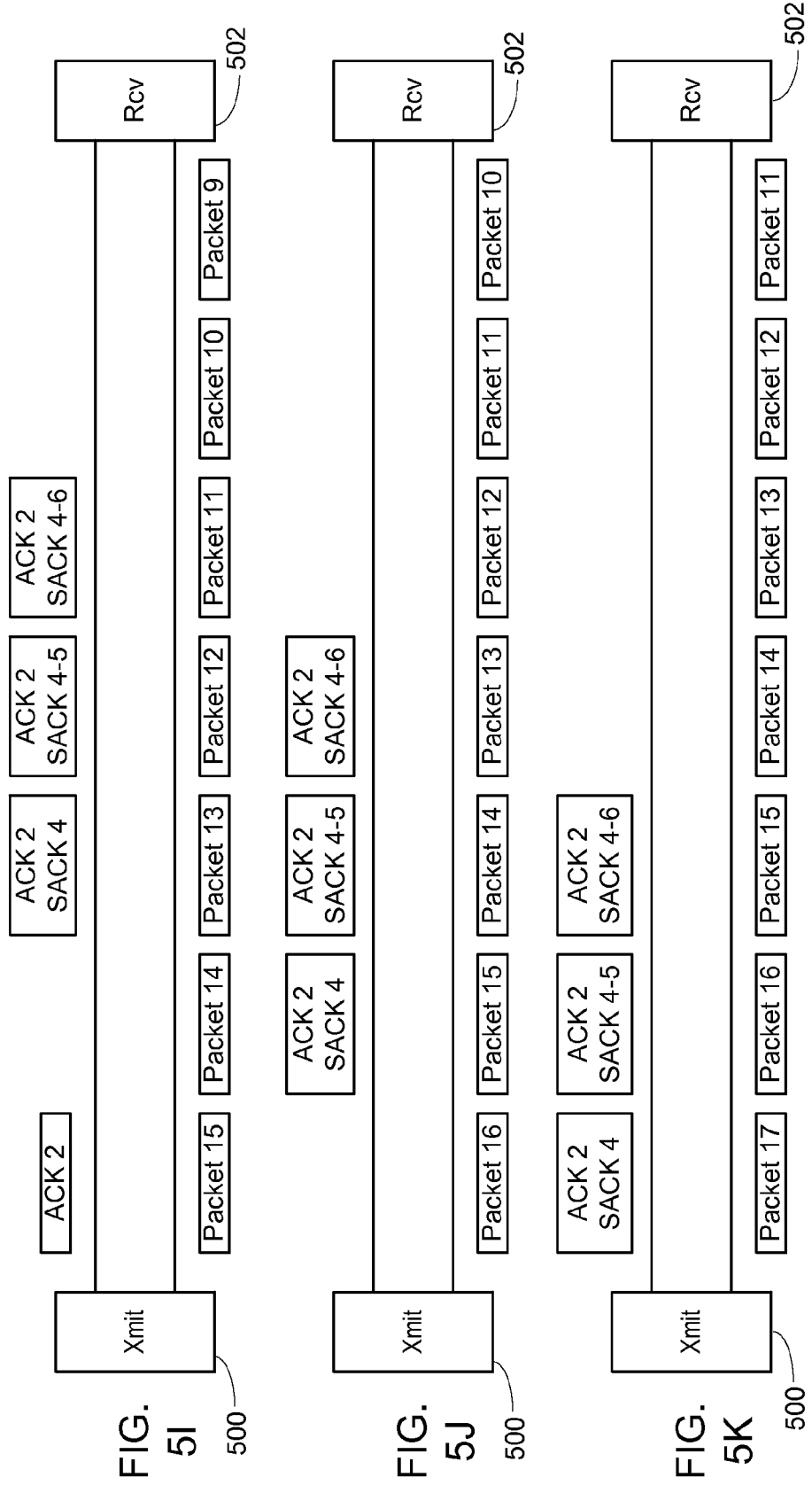

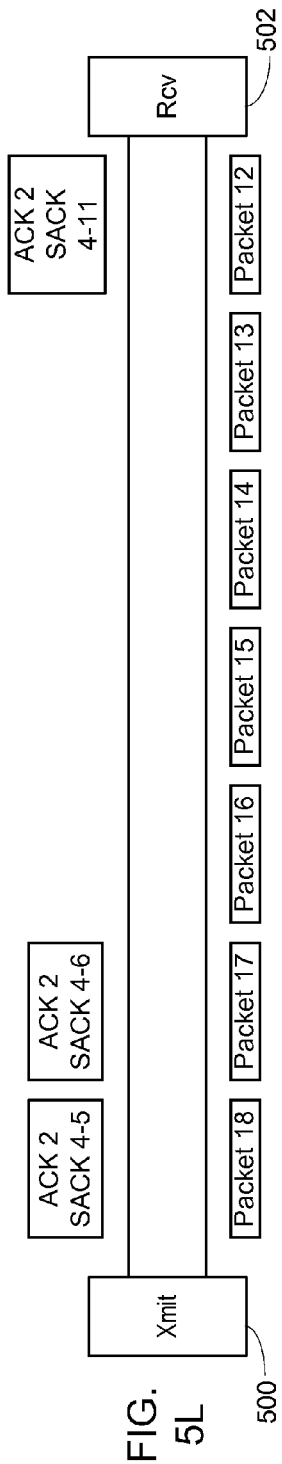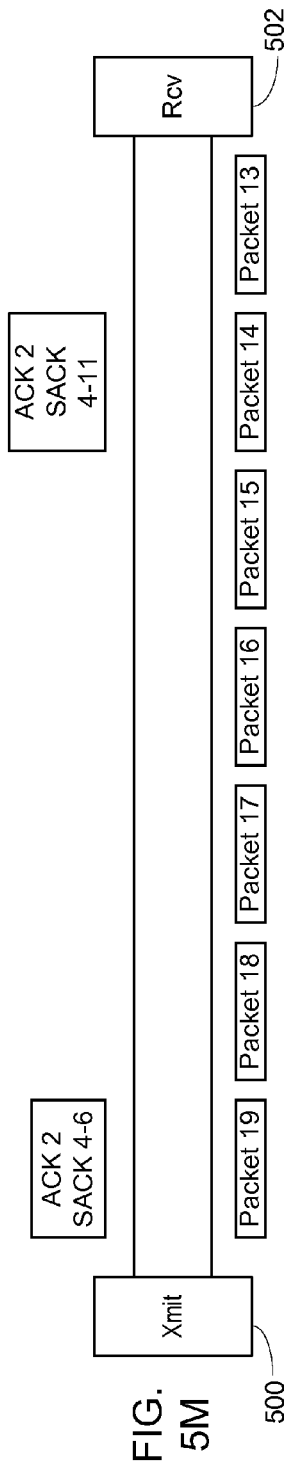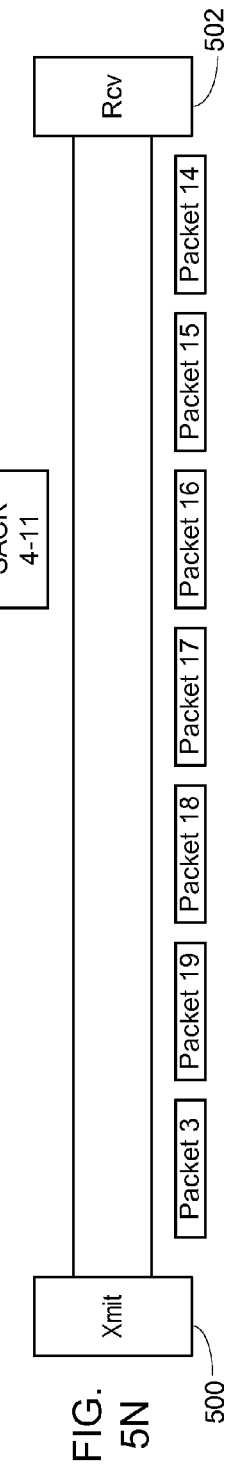
FIG. 5L
FIG. 5M
FIG. 5N

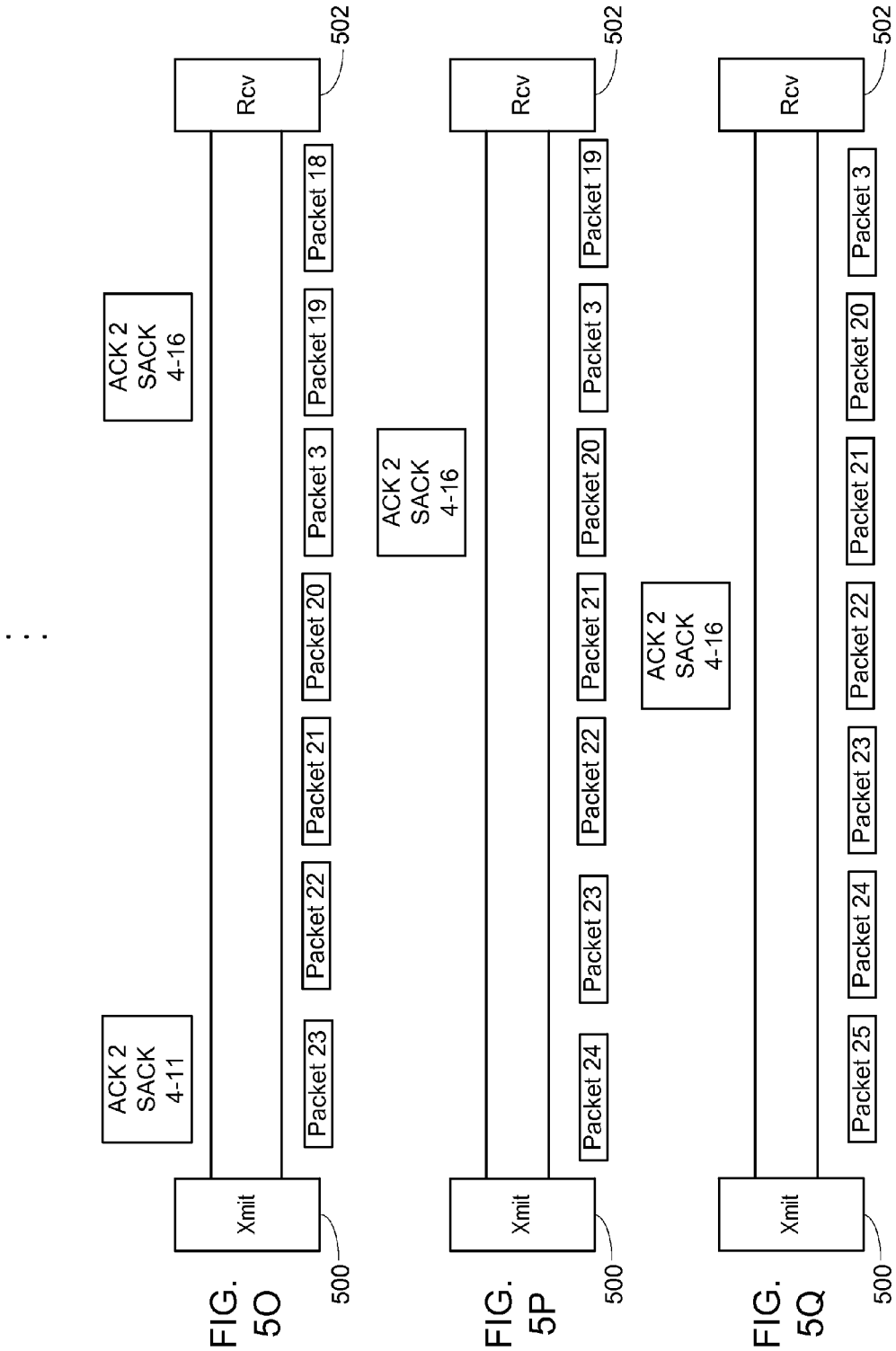

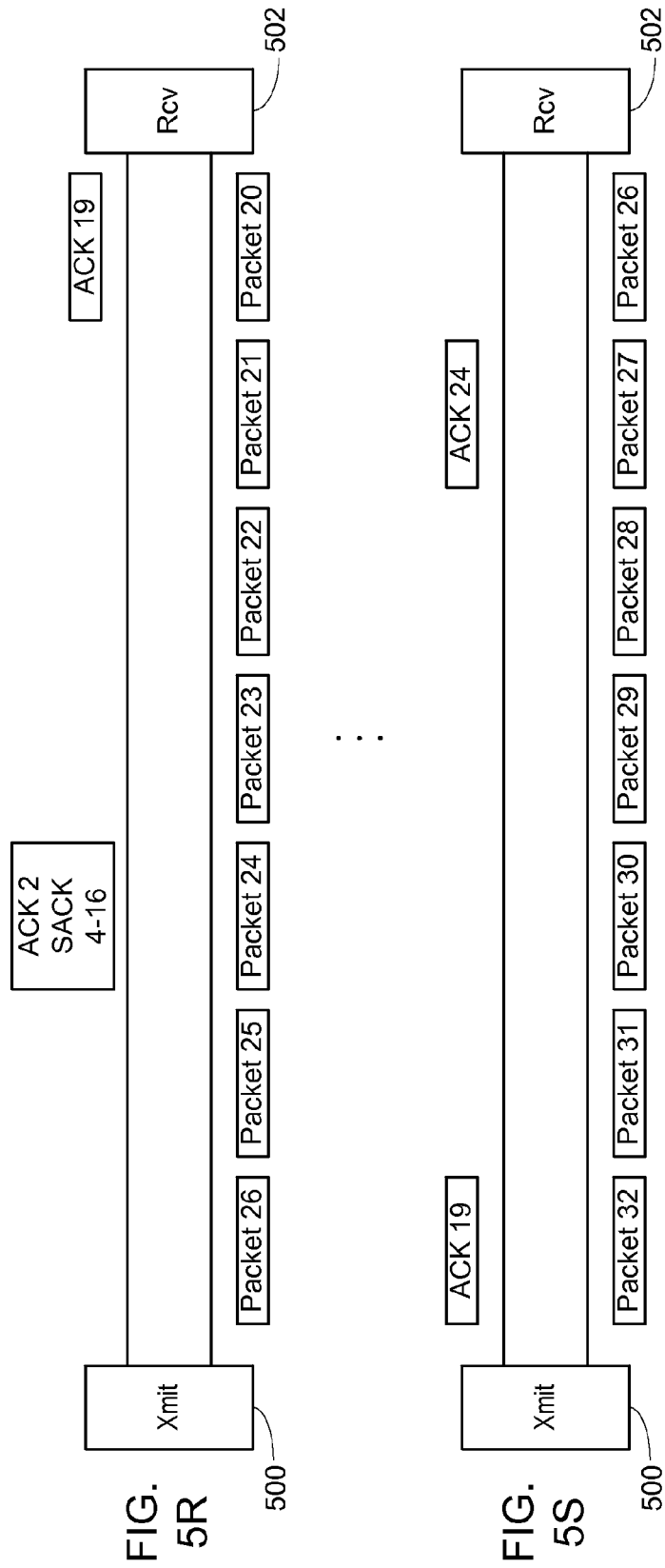

BANDWIDTH OPTIMIZATION USING COALESCED DUP ACKS

CROSS REFERENCE TO RELATED APPLICATIONS

This application claims the benefit under 35 U.S.C. §119 (e) of U.S. Provisional Patent Application Ser. No. 61/681,786, entitled "Bandwidth Optimization Using Coalesced DUP ACKs," filed Aug. 20, 2013, which is hereby incorporated by reference.

BACKGROUND OF THE INVENTION

1. Field of the Invention

The invention relates to network transmission using the TCP protocol.

2. Description of the Related Art

A storage area network (SAN) may be implemented as a high-speed, special purpose network that interconnects different kinds of data storage devices with associated data servers on behalf of a large network of users. Typically, a storage area network includes high performance switches as part of the overall network of computing resources for an enterprise. The storage area network is usually clustered in close geographical proximity to other computing resources, such as mainframe computers, but may also extend to remote locations for backup and archival storage using wide area network carrier technologies. Fibre Channel networking is typically used in SANs although other communications technologies may also be employed, including Ethernet and IP-based storage networking standards (e.g., iSCSI, FCIP (Fibre Channel over Internet Protocol), etc.).

As used herein, the term "Fibre Channel" refers to the Fibre Channel (FC) family of standards (developed by the American National Standards Institute (ANSI)) and other related and draft standards. In general, Fibre Channel defines a transmission medium based on a high speed communications interface for the transfer of large amounts of data via connections between varieties of hardware devices.

FC standards have defined limited allowable distances between FC switch elements. Fibre Channel over IP (FCIP) refers to mechanisms that allow the interconnection of islands of FC SANs over IP-based (internet protocol-based) networks to form a unified SAN in a single FC fabric, thereby extending the allowable distances between FC switch elements to those allowable over an IP network. For example, FCIP relies on IP-based network services to provide the connectivity between the SAN islands over local area networks (LANs), metropolitan area networks (MANs), and wide area networks (WANs). Accordingly, using FCIP, a single FC fabric can connect physically remote FC sites allowing remote disk access, tape backup, and live mirroring.

In an FCIP implementation, FC traffic is carried over an IP network through a logical FCIP tunnel. Each FCIP entity on either side of the IP network works at the session layer of the OSI model. The FC frames from the FC SANs are encapsulated in IP packets and transmission control protocol (TCP) segments and transported in accordance with the TCP layer in one or more TCP sessions. For example, an FCIP tunnel is created over the IP network and a TCP session is opened in the FCIP tunnel.

One common problem in TCP/IP networks is packet loss. Each packet must be acknowledged. Usually this is done sequentially as the packets arrive, but in certain cases packets may be lost or corrupted and following packets received correctly.

For a TCP connection, a TCP packet can either encompass application data or it is a TCP header only packet. For optimal bandwidth utilization, ideally each TCP packet should send application data if available.

Packet loss on the network would cause reception of out of order frames at the TCP receiver. Each out of order packet received on the receiver will generate a TCP header only packet (called Duplicate Acknowledgement or DUP ACK) to inform the transmitter about the loss. The TCP transmitter, on receiving 3 DUP ACKS, will do retransmit of the lost packet and enter fast recovery. In fast recovery, the DUP ACKs received are used to inflate the congestion window. The DUP ACKs going from the TCP receiver to the TCP transmitter do not encompass any application data, however they still consume the bandwidth/rate for that connection.

The bandwidth delay product (i.e. # of inflight bytes/TCP packets) for a high latency connection is very high. In a high latency environment, the number of duplicate ACKs going from the TCP receiver to the TCP transmitter will be very high and will last for an RTT (round trip transit) time. This can substantially impact the rate of application data from the TCP receiver to the TCP transmitter while the DUP ACKs last. If the network from the TCP transmitter to the TCP receiver side is experiencing loss for an extended period of time, it will greatly reduce the application data rate from the TCP receiver to the TCP transmitter.

This may eventually cause bandwidth sensitive traffic to timeout.

SUMMARY OF THE INVENTION

Instead of sending a DUP ACK for every out of order packet received as is conventional, after sending M consecutive DUP ACKs, M generally being three, the TCP receiver generates DUP ACKs every N packets, with N greater than one, with the eventually transmitted DUP ACK containing Selective Acknowledgement (SACK) information. After receiving the third DUP ACK the TCP transmitter uses the positive acknowledgements provided in the SACK information in the TCP header to inflate the congestion window. With the reduced DUP ACKs from the TCP receiver to the TCP transmitter, the impact of TCP DUP ACKs on the data rate from the TCP receiver to the TCP transmitter is substantially reduced.

BRIEF DESCRIPTION OF THE FIGURES

The accompanying drawings, which are incorporated in and constitute a part of this specification, illustrate an implementation of apparatus and methods consistent with the present invention and, together with the detailed description, serve to explain advantages and principles consistent with the invention.

FIGS. 5A-5S illustrate packet flow according to the present invention.

DETAILED DESCRIPTIONS

Figure 1:
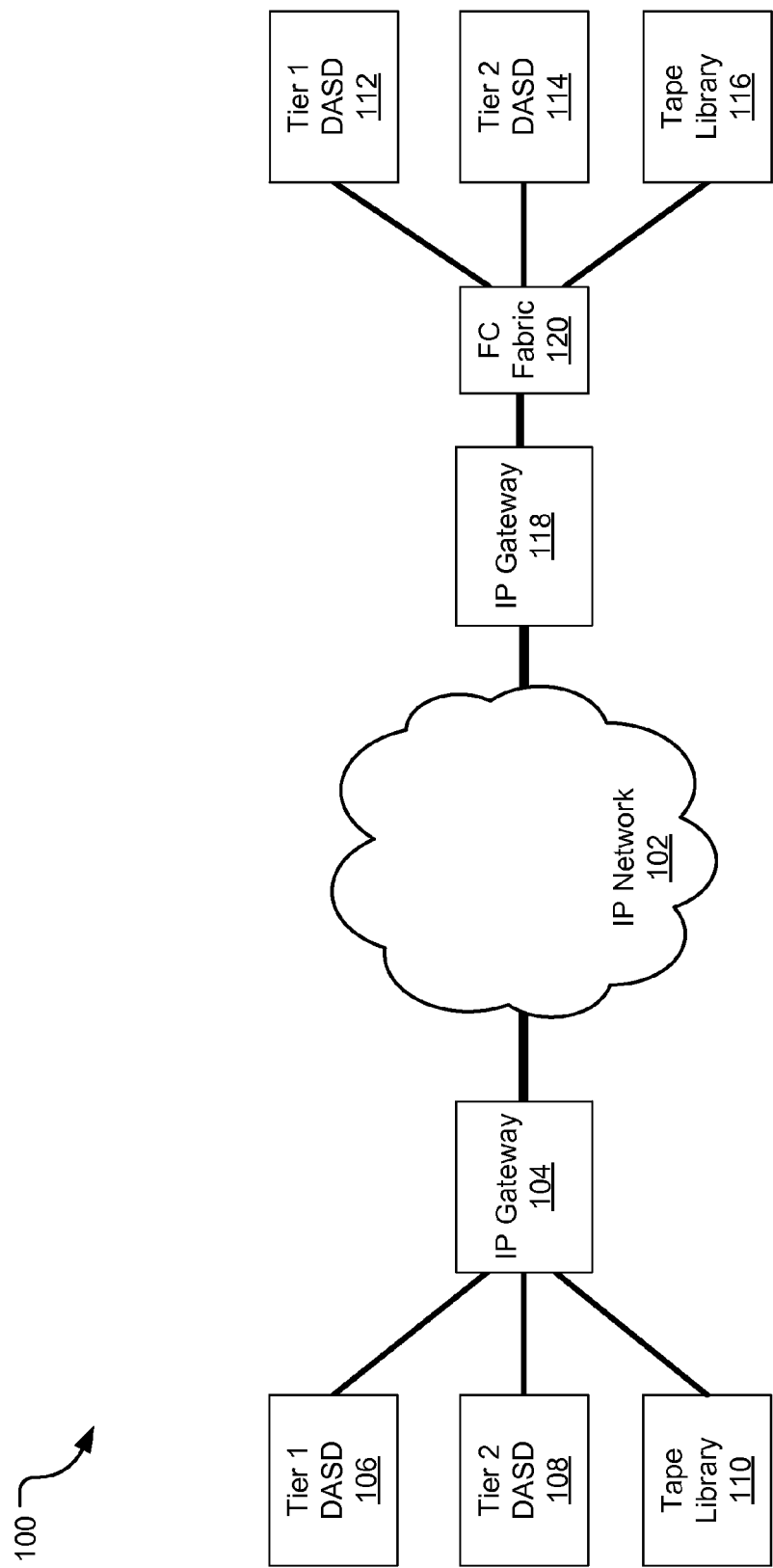
FIG. 1 illustrates an example FCIP configuration using distinct per-priority TCP sessions within a single FCIP tunnel over an IP network.

FIG. 1 illustrates an example FCIP configuration 100 using distinct per-priority TCP sessions within a single FCIP tunnel over an IP network 102. An IP gateway device 104 (e.g., an FCIP extender), couples example FC source nodes (e.g., Tier 1 Direct Access Storage Device (DASD) 106, Tier 2 DASD 108, and a tape library 110) to the IP network 102 for communication to example FC destination nodes (e.g., Tier 1 DASD 112, Tier 2 DASD 114, and a tape library 116, respectively) through an IP gateway device 118 (e.g., another FCIP extender) and an FC fabric 120. Generally, an IP gateway device interfaces to an IP network. In the specific implementation illustrated in FIG. 1, the IP gateway device 118 interfaces between an IP network and an FC fabric, but other IP gateway devices may include tape extension devices, Ethernet network interface controllers (NICs), host bus adapters (HBAs), and director level switches). An example application of such an FCIP configuration would be a remote data replication (RDR) scenario, wherein the data on the Tier 1 DASD 106 is backed up to the remote Tier 1 DASD 112 at a high priority, the data on the Tier 2 DASD 108 is backed up to the remote Tier 2 DASD 114 at a medium priority, and data on the tape library no is backed up to the remote tape library 116 at a low priority. In addition to the data streams, a control stream is also communicated between the IP gateway devices 104 and 118 to pass class-F control frames.

The IP gateway device 104 encapsulates FC packets received from the source nodes 106, 108, and 110 in TCP segments and IP packets and forwards the TCP/IP-packet-encapsulated FC frames over the IP network 102. The IP gateway device 118 receives these encapsulated FC frames from the IP network 102, "de-encapsulates" them (i.e., extracts the FC frames from the received IP packets and TCP segments), and forwards the extracted FC frames through the FC fabric 120 to their appropriate destination nodes 112, 114, and 116. It should be understood that each IP gateway device 104 and 118 can perform the opposite role for traffic going in the opposite direction (e.g., the IP gateway device 118 doing the encapsulating and forwarding through the IP network 102 and the IP gateway device 104 doing the de-encapsulating and forwarding the extracted FC frames through an FC fabric). In other configurations, an FC fabric may or may not exist on either side of the IP network 102. As such, in such other configurations, at least one of the IP gateway devices 104 and 118 could be a tape extender, an Ethernet NIC, etc.

Each IP gateway device 104 and 118 includes an IP interface, which appears as an end station in the IP network 102. Each IP gateway device 104 and 118 also establishes a logical FCIP tunnel through the IP network 102. The IP gateway devices 104 and 118 implement the FCIP protocol and rely on the TCP layer to transport the TCP/IP-packet-encapsulated FC frames over the IP network 102. Each FCIP tunnel between two IP gateway devices connects two TCP end points in the IP network 102. Viewed from the FC perspective, pairs of switches export virtual E_PORTs or virtual EX_PORTs (collectively referred to as virtual E_PORTs) that enable forwarding of FC frames between FC networks, such that the FCIP tunnel acts as an FC Inter-Switch Link (ISL) over which encapsulated FC traffic flows.

The FC traffic is carried over the IP network 102 through the FCIP tunnel between the IP gateway device 104 and the IP gateway device 118 in such a manner that the FC fabric 102 and all purely FC devices (e.g., the various source and destination nodes) are unaware of the IP network 102. As such, FC datagrams are delivered in such time as to comply with applicable FC specifications.

To accommodate multiple levels of priority, the IP gateway devices 104 and 118 create distinct TCP sessions for each level of priority supported, plus a TCP session for a class-F control stream. In one implementation, low, medium, and high priorities are supported, so four TCP sessions are created between the IP gateway devices 104 and 118, although the number of supported priority levels and TCP sessions can vary depending on the network configuration. The control stream and each priority stream is assigned its own TCP session that is autonomous in the IP network 102, getting its own TCP stack and its own settings for VLAN Tagging (IEEE 802.1Q), quality of service (IEEE 802.1P) and Differentiated Services Code Point (DSCP). Furthermore, the traffic flow in each per priority TCP session is enforced in accordance with its designated priority by an algorithm, such as but not limited to a deficit weighted round robin (DWRR) scheduler. All control frames in the class-F TCP session are strictly sent on a per service interval basis.

Figure 2:
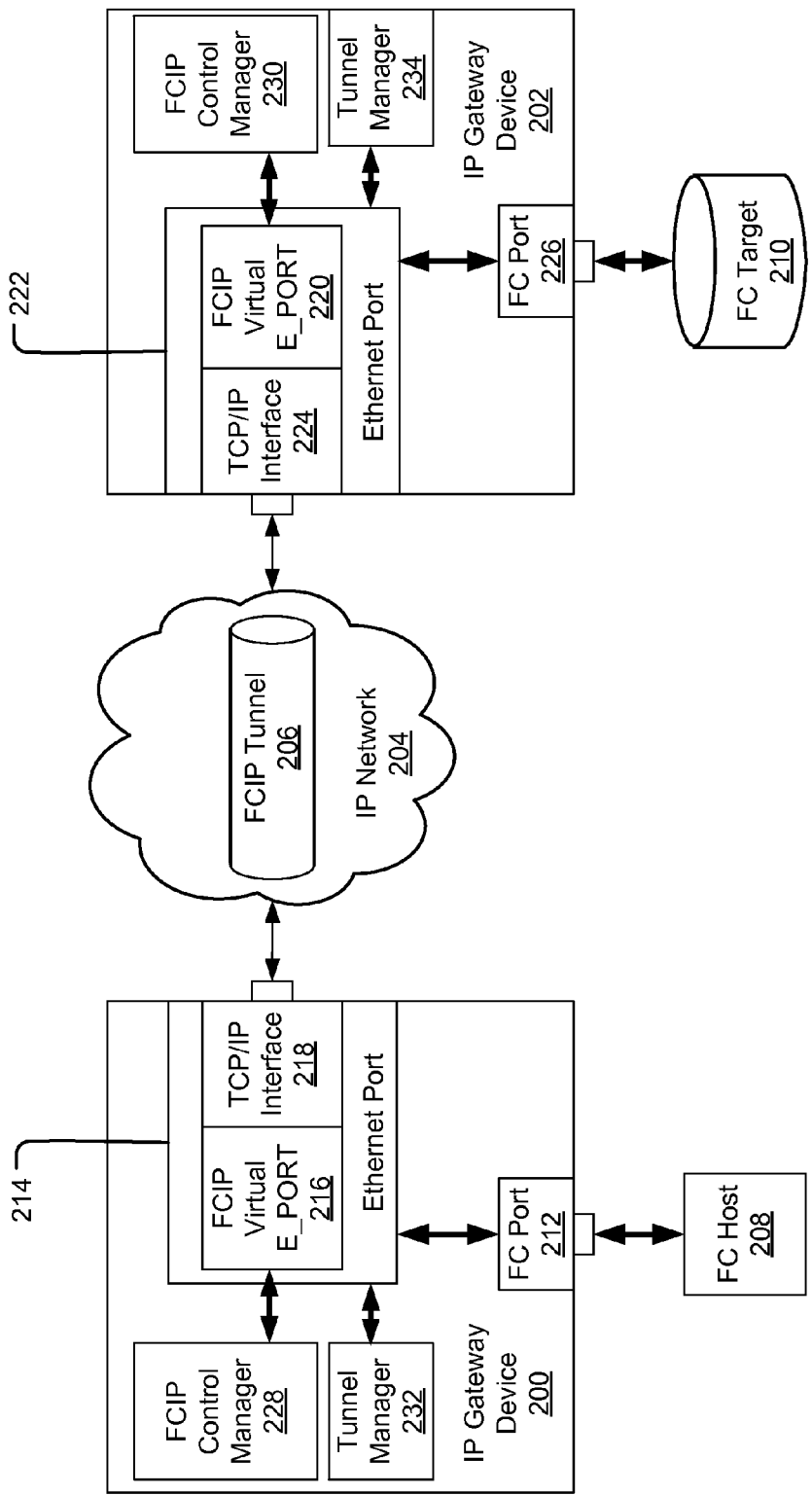
FIG. 2 illustrates example IP gateway devices communicating over an IP network using distinct per priority TCP sessions within a single FCIP.

FIG. 2 illustrates example IP gateway devices 200 and 202 (e.g., FCIP extension devices) communicating over an IP network 204 using distinct per priority TCP sessions within a single FCIP tunnel 206. An FC host 208 is configured to send data to an FC target 210 through the IP network 204. It should be understood that other data streams between other FC source devices (not shown) and FC target devices (not shown) can be communicated at various priority levels over the IP network 204.

The FC host 208 couples to an FC port 212 of the IP gateway device 200. The coupling may be made directly between the FC port 212 and the FC host 208 or indirectly through an FC fabric (not shown). The FC port 212 receives FC frames from the FC host 208 and forwards them to an Ethernet port 214, which includes an FCIP virtual E_PORT 216 and a TCP/IP interface 218 coupled to the IP network 204. The FCIP virtual E_PORT 216 acts as one side of the logical ISL formed by the FCIP tunnel 206 over the IP network 204. An FCIP virtual E_PORT 220 in the IP gateway device 202 acts as the other side of the logical ISL. The Ethernet port 214 encapsulates each FC frame received from the FC port 212 in a TCP segment belonging to the TCP session for the designated priority and an IP packet shell and forwards them over the IP network 204 through the FCIP tunnel 206.

The FC target 210 couples to an FC port 226 of the IP gateway device 202. The coupling may be made directly between the FC port 226 and the FC host 210 or indirectly through an FC fabric (not shown). An Ethernet port 222 receives TCP/IP-packet-encapsulated FC frames over the IP network 204 from the IP gateway device 200 via a TCP/IP interface 224. The Ethernet port 222 de-encapsulates the received FC frames and forwards them to an FC port 226 for communication to the FC target device 210.

It should be understood that data traffic can flow in either direction between the FC host 208 and the FC target 210. As such, the roles of the IP gateway devices 200 and 202 may be swapped for data flowing from the FC target 210 and the FC host 208.

Tunnel manager modules 232 and 234 (e.g., circuitry, firmware, software or some combination thereof) of the IP gateway devices 200 and 202 set up and maintain the FCIP tunnel 206. Either IP gateway device 200 or 202 can initiate the FCIP tunnel 206, but for this description, it is assumed that the IP gateway device 200 initiates the FCIP tunnel 206. After the Ethernet ports 214 and 222 are physically connected to the IP network 204, data link layer and IP initialization occur. The TCP/IP interface 218 obtains an IP address for the IP gateway device 200 (the tunnel initiator) and determines the IP address and TCP port numbers of the remote IP gateway device 202. The FCIP tunnel parameters may be configured manually, discovered using Service Location Protocol Version 2 (SLPv2), or designated by other means. The IP gateway device 200, as the tunnel initiator, transmits an FCIP Special Frame (FSF) to the remote IP gateway device 202. The FSF contains the FC identifier and the FCIP endpoint identifier of the IP gateway device 200, the FC identifier of the remote IP gateway device 202, and a 64-bit randomly selected number that uniquely identifies the FSF. The remote IP gateway device 202 verifies that the contents of the FSF match its local configuration. If the FSF contents are acceptable, the unmodified FSF is echoed back to the (initiating) IP gateway device 200. After the IP gateway device 200 receives and verifies the FSF, the FCIP tunnel 206 can carry encapsulated FC traffic.

The TCP/IP interface 218 creates multiple TCP sessions through the single FCIP tunnel 206. In the illustrated implementation, three or more TCP sessions are created in the single FCIP tunnel 206. One TCP connection is designated to carry control data (e.g., class-F data), and the remaining TCP sessions are designated to carry data streams having different levels of priority. For example, considering a three priority QoS scheme, four TCP sessions are created in the FCIP tunnel 206 between the IP gateway device 200 and the IP gateway device 202, one TCP session designated for control data, and the remaining TCP sessions designated for high, medium, and low priority traffic, respectively. Note: It should be understood that multiple TCP sessions designated with the same level of priority may also be created (e.g., two high priority TCP sessions) within the same FCIP tunnel.

The FCIP tunnel 206 maintains frame ordering within each priority TCP flow. The QoS enforcement engine may alter the egress transmission sequence of flows relative to their ingress sequence based on priority. However, the egress transmission sequence of frames within an individual flow will remain in the same order as their ingress sequence to that flow. Because the flows are based on FC initiator and FC target, conversational frames between two FC devices will remain in proper sequence. A characteristic of TCP is to maintain sequence order of bytes transmitted before deliver to upper layer protocols. As such, the IP gateway device at the remote end of the FCIP tunnel 206 is responsible for reordering data frames received from the various TCP sessions before sending them up the communications stack to the FC application layer. Furthermore, in one implementation, each TCP session can service as a backup in the event a lower (or same) priority TCP session fails. Each TCP session can be routed and treated independently of others via autonomous settings for VLAN and Priority Tagging and/or DSCP.

In addition to setting up the FCIP tunnel 206, the IP gateway device 200 may also set up TCP trunking through the FCIP tunnel 206. TCP trunking allows the creation of multiple FCIP connections within the FCIP tunnel 206, with each FCIP connection connecting a source-destination IP address pair. In addition, each FCIP connection can maintain multiple TCP sessions, each TCP session being designated for different priorities of service. As such, each FCIP connection can have different attributes, such as IP addresses, committed rates, priorities, etc., and can be defined over the same Ethernet port or over different Ethernet ports in the IP gateway device. The trunked FCIP connections support load balancing and provide failover paths in the event of a network failure, while maintaining in-order delivery. For example, if one FCIP connection in the TCP trunk fails or becomes congested, data can be redirected to a same-priority TCP session of another FCIP connection in the FCIP tunnel 206. The IP gateway device 202 receives the TCP/IP-packet-encapsulated FC frames and reconstitutes the data streams in the appropriate order through the FCIP virtual E_PORT 220. These variations are described in more detail below.

Each IP gateway device 200 and 202 includes an FCIP control manager (see FCIP control managers 228 and 230), which generate the class-F control frames for the control data stream transmitted through the FCIP tunnel 206 to the FCIP control manager in the opposing IP gateway device. Class-F traffic is connectionless and employs acknowledgement of delivery or failure of delivery. Class-F is employed with FC switch expansion ports (E_PORTS) and is applicable to the IP gateway devices 200 and 202, based on the FCIP virtual E_PORT 216 and 220 created in each IP gateway device. Class-F control frames are used to exchange routing, name service, and notifications between the IP gateway devices 200 and 202, which join the local and remote FC networks into a single FC fabric. However, the described technology is not limited to combined single FC fabrics and is compatible with FC routed environments.

The IP gateway devices 200 and 202 emulate raw FC ports (e.g., VE_PORTs or VEX_PORTs) on both of the FCIP tunnel 206. For FC I/O data flow, these emulated FC ports support ELP (Exchange Link Parameters), EFP (Exchange Fabric Parameters, and other FC-FS (Fibre Channel—Framing and Signaling) and FC-SW (Fibre Channel—Switched Fabric) protocol exchanges to bring the emulated FC E_PORTs online. After the FCIP tunnel 206 is configured and the TCP sessions are created for an FCIP connection in the FCIP tunnel 206, the IP gateway devices 200 and 202 will activate the logical ISL over the FCIP tunnel 206. When the ISL has been established, the logical FC ports appear as virtual E_PORTs in the IP gateway devices 200 and 202. For FC fabric services, the virtual E_PORTs emulate regular E_PORTs, except that the underlying transport is TCP/IP over an IP network, rather than FC in a normal FC fabric. Accordingly, the virtual E_PORTs 216 and 220 preserve the "semantics" of an E_PORT.

Figure 3A:
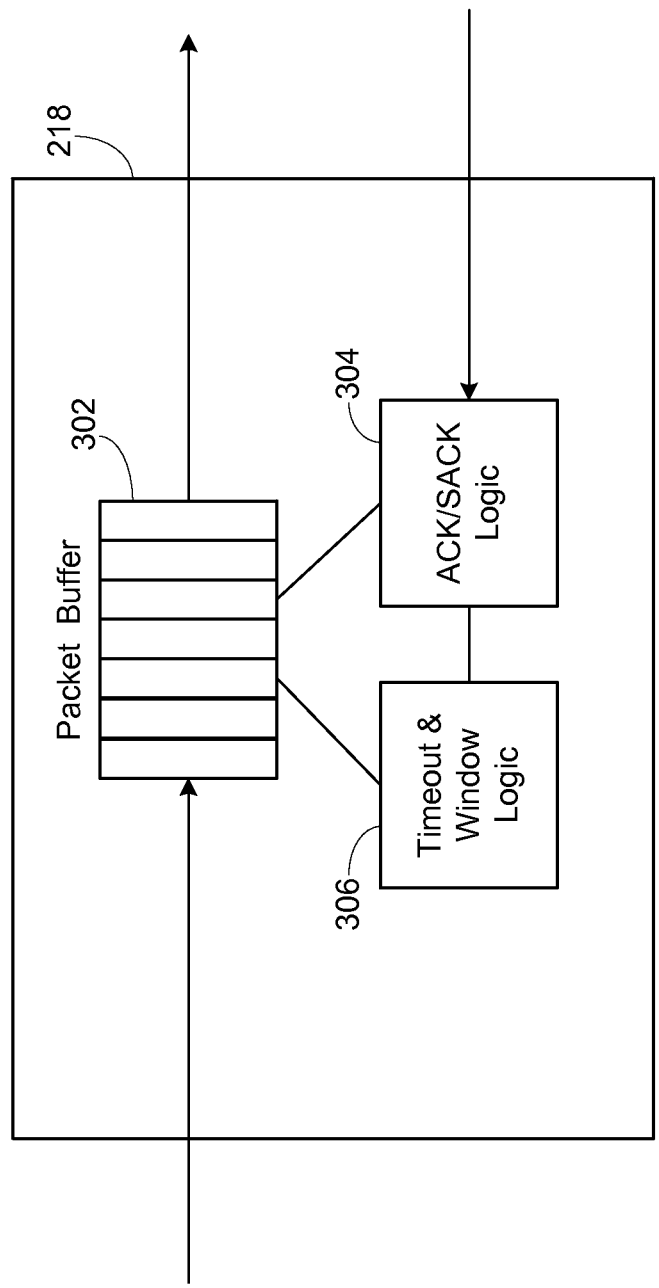
FIG. 3A illustrates a logical block diagram of portions of a transmitter TCP/IP interface according to the present invention.

FIG. 3A is a logical block diagram of portions of the transmitter TCP/IP interface 218 according to the preferred embodiment. It is noted that this is a logical representation and actual embodiments may implemented differently, either in hardware, software or a combination thereof. A packet buffer 302 holds a series of TCP/IP packets to be transmitted. As is normal practice in TCP, the packets are not removed from the buffer until either an ACK for that packet is received or the packet times out. A ACK/SACK logic block 304 is connected to the packet buffer 302 and receives ACKs and SACKs from the IP network. The ACK/SACK logic block 304 is responsible for directing packets be removed from the packet buffer 302, such as by setting a flag so that the packet buffer 302 hardware can remove the packet. A timeout logic module 306 is connected to the packet buffer 302 and the ACK/SACK logic module 304. The timeout logic module 306 monitors the period each of the TCP/IP packets have been in the packet buffer 302 so that after the timeout period, as well known to those skilled in the art, timeout operations can proceed based on the particular TCP/IP packet being considered lost or otherwise not able to be received. The timeout logic module 306 is connected to the ACK/SACK logic module 304 to allow the ACK/SACK logic module 304 to monitor TCP/IP packet timeout status.

Figure 3B:
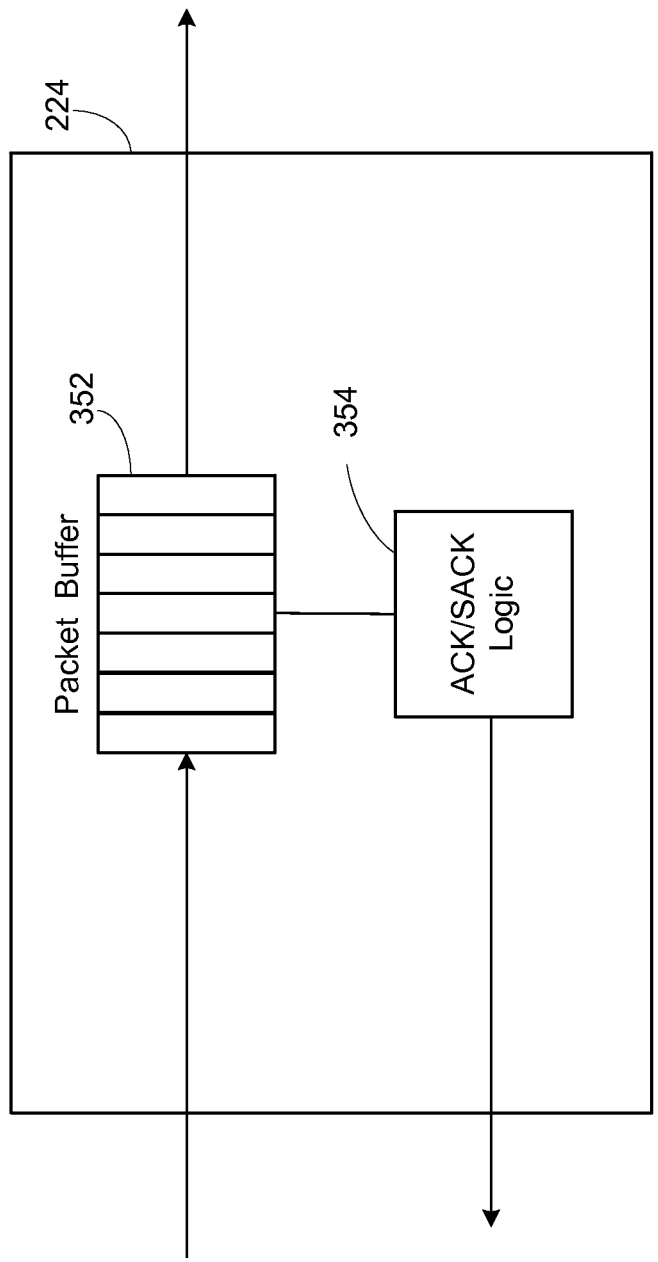
FIG. 3B illustrates a logical block diagram of portions of a receiver TCP/IP interface according to the present invention.

FIG. 3B is a logical block diagram of portions of the receiver TCP/IP interface 224 according to the preferred embodiment. It is noted that this is a logical representation and actual embodiments may implemented differently, either in hardware, software or a combination thereof. A packet buffer 352 holds a series of TCP/IP packets that have been received. As is normal practice in TCP, the packets are not removed from the buffer if there are missing packets ahead of the packet in the sequence. An ACK/SACK logic block 354 is connected to the packet buffer 352 and generates ACKs and SACKs to the IP network. The ACK/SACK logic block 354 is responsible for directing packets be removed from the packet buffer 352, such as by setting a flag so that the packet buffer 352 hardware can remove the packet. The ACK/SACK logic block 354 provides ACKs and SACKs as discussed below. The packet buffer 352 informs the ACK/SACK logic block 354 when packets have been received and when packets are missing from the order to allow the ACK/SACK logic block 354 to send ACKs and SACKs are appropriate.

According to the present invention, with SACK enabled on a TCP connection, the amount of DUP ACKs going from TCP receiver to TCP transmitter is greatly reduced. Instead of sending a DUP ACK for every out of order packet received, the TCP receiver generates DUP ACKs every N packets, with N greater than one, with the eventually transmitted DUP ACK containing SACK information. The TCP transmitter uses the SACK information in the TCP header to inflate the congestion window. With the reduced DUP ACKs from the TCP receiver to the TCP transmitter, the impact of TCP DUP ACKs on data rate from the TCP receiver to the TCP transmitter is substantially reduced.

Conventional operation is illustrated in FIGS. 4A-4Q. In FIG. 4A an exemplary packet stream is provided. In the example the length of the link allows seven full length packets to be on the link, so the round trip time is approximately fourteen full length packets. This size is just exemplary and it is understood that in practice the number can vary, often being significantly larger in a FCIP context, where hundreds or even thousands of packets may be on the link. It is also noted that only traffic from the transmitter 400 to the receiver 402 and the responsive ACKs are shown. It is understood that the link is full duplex and the receiver 402 would also be transmitting packets to the transmitter 400. This is the traffic that will be delayed or hindered by the string of DUP ACKs. It is also noted that the ACK and SACK response packets have been illustrated as the same length as the forward direction full length packets. This is just for illustration purposes as it is understood that ACK and SACK packets are very short packets. While this use of same length ACK and SACK packets exaggerates the lost bandwidth on the link, the exaggeration is considered helpful to illustrate the issue and the resolution according to the present invention.

In FIG. 4B packet 1 has been successfully received and its ACK 1 is provided for return. It is noted in FIG. 4B that packet 3 has gotten lost. In FIG. 4C packet 2 has been received and its ACK 2 sent. In FIG. 4D the packets and ACKs just progress on the links as packet 3 is missing.

Figure 4E:
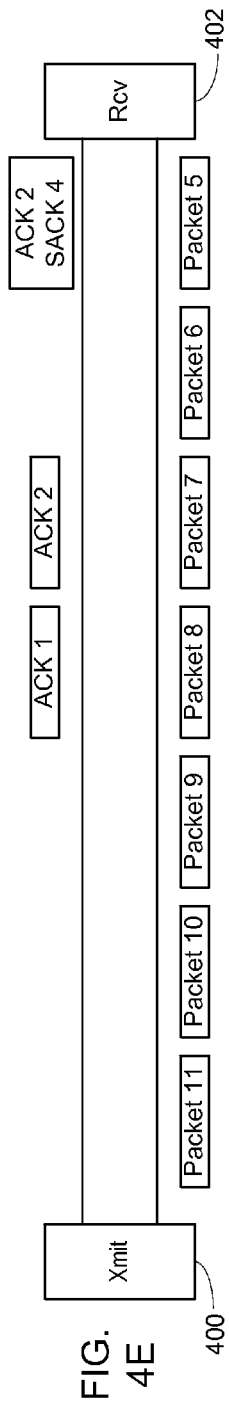
FIGS. 4A-4Q illustrate DUP ACK packet flow according to the prior art.
Figure 4F:
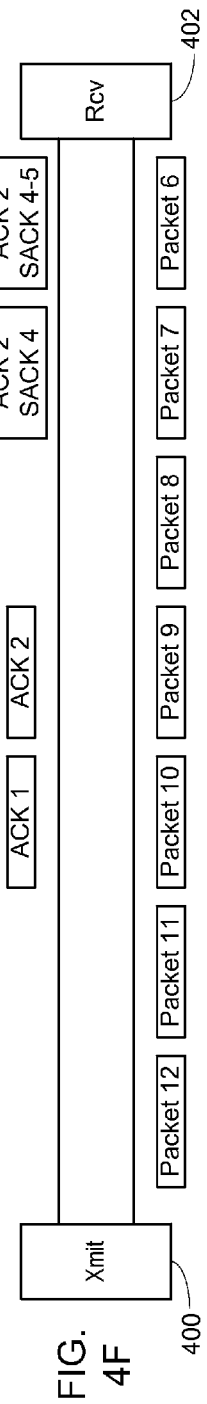
Figure 4G:
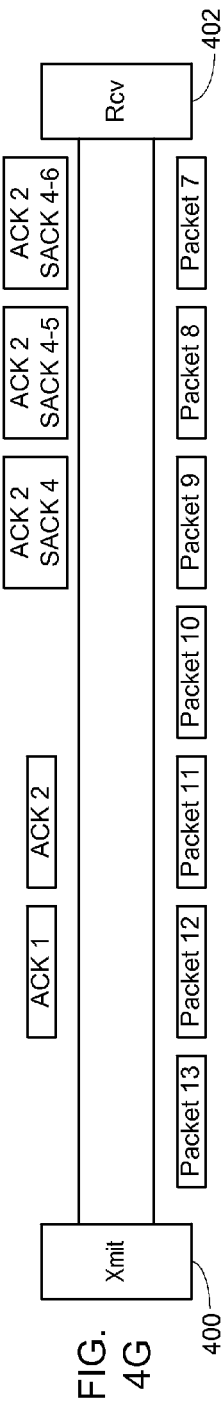
Figure 4H:
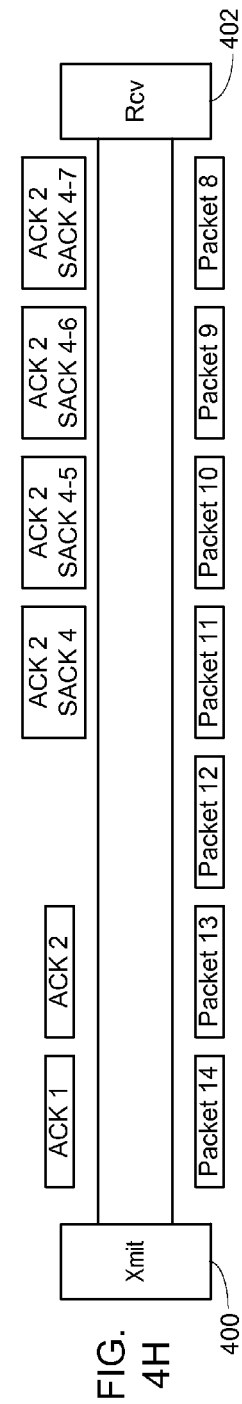

FIG. 4E illustrates the first DUP ACK as packet 4 has been received, shown as a second ACK 2, as packet 2 is the last successfully received packet without a missing packet in sequence, and a SACK 4 to indicate receipt of packet 4. As known to one skilled in the art, SACK information is provided in an ACK packet, so this ACK SACK format is used to specifically indicate the ACK portion and the additional SACK information. This receipt of packets and transmission of ACK 2 SACK 4-x, x being the last packet received, responses continues to FIG. 4K where the first DUP ACK or second ACK 2 packet is to be received, the ACK 2 SACK 4 packet actually being received in FIG. 4L. The second DUP ACK is received in FIG. 4M and the third DUP ACK is received in FIG. 4N. As this is the third DUP ACK, per standard fast retransmit procedures, missing packet 3 is retransmitted. The string of DUP ACKS or ACK 2 SACK 4-x packets continues through FIG. 4O as packet 3 traverses the link. Finally as illustrated in FIG. 4P the retransmitted packet 3 is received and an ACK 19 is provided as now all packets up to packet 19 have been successfully received. FIG. 4Q illustrates the ACK 19 packet traversing the link, with the next ACK packet being ACK 24 as a form of ACK reduction is in use to perform normal reverse link bandwidth management.

As can be seen from the FIGS. 4A-4Q, the DUP ACKs have used a great deal of the reverse bandwidth, the bandwidth from the receiver 402 back to the transmitter 400. The illustration shows all bandwidth being used but it is understood that this is an exaggerated illustration. A simple comparison can be made to FIG. 4Q where reduced ACK flow is illustrated to show the larger available bandwidth.

FIGS. 5A-5S illustrate operation according to the present invention. FIGS. 5A-5G are the same as FIGS. 4A-4G. In the preferred embodiment each DUP ACK packet is done as an ACK SACK packet. In alternate embodiments the first two DUP ACKs could be normal ACKs, without the SACK information, if desired. In further alternate embodiments the first M packets would be DUP ACKs, though generally M would not be greater than three as the third DUP ACK packet will trigger the retransmission of packet 3. As noted above, it is understood that the SACK information is added to an ACK packet so that the packet operates as a normal ACK but the SACK information provides additional functionality.

In the preferred embodiment, as shown in FIGS. 5F and 5G, ACK SACK packets are provided with each received packet, with the received packet information changing with each packet. In an alternate embodiment where simple ACKs are provided for the first two DUP ACKs, the third DUP ACK is provided as an ACK SACK packet to begin the preferred limited reduced DUP ACK operations according to the present invention.

In FIG. 5H no ACK or SACK is shown even though packet 7 has been successfully received. This is a result of the generation of the DUP ACK packets every N packets, in the illustration N being 5. Therefore the next ACK SACK packet is provided in FIG. 5L, after receipt of packet n, shown as ACK 2 SACK 4-11. As can be seen, this reduction of ACKs by N allows more bandwidth for the normal transmission activities of the receiver 502, unlike in the prior art where the DUP ACK string consumes significant bandwidth.

In FIG. 5L the transmitter 500 has received the first DUP ACK packet, the ACK 2 SACK 4 packet. In FIG. 5M the transmitter 500 has received the second ACK SACK. In FIG. 5N the transmitter 500 has received the third ACK SACK, the third DUP ACK, so the transmitter retransmits packet 3. In an alternate embodiment the transmitter 500 also increases the congestion window based on the SACK information indicating the receipt of packets 4-6. In the preferred embodiment this congestion window inflation occurs at the next DUP ACK packet, the first DUP ACK packet after the receiver 502 receives five more packets.

In FIG. 5O the SACK 4-11 packet transmitted in FIG. 5L has reached the transmitter 500. In FIG. 5P the transmitter 500 has received the SACK 4-11 packet. In the preferred embodiment the transmitter 500 now begins inflating the congestion window. As the last indicated received packet was packet 2, the SACK 4-11 packet indicates that packets 4-11 have also been successfully received, so the transmitter 500 increases the congestion window by the size of packets 4-11. When the ACK 2 SACK 4-16 packet is received, the transmitter 500 inflates the congestion window by the size of packets 2-16.

Ultimately in FIG. 5R the receiver 502 receives retransmitted packet 3 and sends a normal ACK 19, indicating receipt of all packets up to packet 9. In FIG. 5S the ACK 19 packet has reached the transmitter 500, so that in the next cycle the congestion window is reduced to its normal size when receipt of the retransmitted packet 3 is acknowledged and packets 3-19 can be removed from the packet buffer 302.

For the case where the TCP transmitter and receiver are running at the same rate for Internet Protocol Security (IPSEC) over an IPv4 connection, DUP ACKs of the type shown above for the prior operation reduce the rate from the TCP receiver to the TCP transmitter by 9% for RTT period of time. According to the present invention with the coalesced DUP ACKs, for a value of N being 10, the impact is reduced to 1%. This allows better utilization of the link for transmission and improves overall throughput.

It is noted that this optimization of the bandwidth utilization by reducing the DUP ACKs provides the improvement without adding any extra overhead or proprietary information.

The above description is intended to be illustrative, and not restrictive. For example, the above-described embodiments may be used in combination with each other. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A transmission control protocol (TCP) receiver comprising:
a port for receiving and transmitting TOP packets;
packet detection logic coupled to said port to determine, and indicate when a TCP packet has been received and has been missed based on receipt of a TCP packet; and
acknowledgement (ACK) logic coupled to said packet detection logic and said port to provide a duplicate ACK for transmission from said port for each received packet indication after an indication of a missed packet indication by said packet detection logic until M duplicate ACKs have been provided, M being a value sufficient to trigger retransmission, and then to provide a duplicate ACK for transmission from said port every $N^{th}$ number of received packet indications, N being greater than one, said duplicate ACKs provided every $N^{th}$ number of received packet indications including selective acknowledgement (SACK) information on packets received; wherein M equals 3.

2. The TCP receiver of claim 1, wherein said M duplicate ACKs include SACK information.

3. A transmission control protocol (TOP) transmitter comprising: a port for receiving and transmitting TCF packets; a packet buffer coupled to said port for storing packets to be transmitted; ACK/SACK logic coupled to said packet buffer and said port for receiving and processing acknowledgements (ACKs) and selective acknowledgment (SACK) information received at said port, said SACK information including packets received, said ACK/SACK logic cooperating with said packet buffer to retransmit a given packet after said given packet has been indicated missing by three duplicate ACKs, only thereafter receiving duplicate ACKs with SACK information every $N^{th}$ number of received packets after the successful receipt of a first number of packets after said missing packet and thereafter receiving an ACK including said missing packet; and window logic coupled to said ACK/SACK logic to inflate the congestion window by the size of packets indicated received by said ACK/SACK logic and to reduce the congestion window size when said missing packet is indicated received by an ACK.

4. The TCP transmitter of claim 3, wherein the congestion window inflation is started on the first duplicate ACK after the third duplicate ACK.

5. A network comprising: a network Internet protocol (IP) link; a transmission control protocol (TCP) receiver coupled to said IP link, said TCP receiver including: a TCP receiver port coupled to said IP link for receiving and transmitting TCP packets; packet detection logic coupled to said TCP receiver port to determine and indicate when a TCP packet has been received and has been missed based on receipt of a TCP packet; and acknowledgement (ACK) logic coupled to said packet detection logic and said TCP receiver port to provide a duplicate ACK for transmission from said TCP receiver port for each received packet indication after an indication of a missed packet indication by said packet detection logic until M duplicate ACKs have been provided, M being a value sufficient to trigger retransmission, and then to provide a duplicate ACK for transmission from said TCP receiver port every $N^{th}$ number of received packet indications, N being greater than one, said duplicate ACKs provided every $N^{th}$ number of received packet indications including selective acknowledgment (SACK) information on packets received; and a TCP transmitter coupled to said IP link, said TCP transmitter including: a TCP transmitter port coupled to said IP link for receiving and transmitting TCP packets; a packet buffer coupled to said TCP transmitter port for storing packets to be transmitted; ACK/SACK logic coupled to said packet buffer and said TCF transmitter port for receiving and processing ACKs and SACK information received at said TCP transmitter port, said ACK/SACK logic cooperating with said packet buffer to retransmit a given packet after said given packet has been indicated missing by M duplicate ACKs, only thereafter receiving duplicate ACKs with SACK information every $N^{th}$ number of received packets after the successful receipt of a first number of packets after said missing packet and thereafter receiving an ACK including said missing packet; and window logic coupled to said ACK/SACK logic to inflate the congestion window by the size of packets indicated received by said ACK/SACK logic and to reduce the congestion window size when said missing packet is indicated received by an ACK.

6. The network of claim 5, wherein said M duplicate ACKs include SACK information.

7. The network of claim 5, wherein M equals 3.

8. The network of claim 5, wherein the congestion window inflation is started on the first duplicate ACK after the third duplicate ACK.

9. A method comprising:
receiving a sequence of transmission control protocol (TCP) packets;
determining that a TCP packet in said sequence has been missed; and
providing a duplicate acknowledgement (ACK) for transmission for each received packet indication after an indication of a missed packet indication by said packet detection logic until M duplicate ACKs have been provided, M being a value sufficient to trigger retransmission, and then providing a duplicate ACK for transmission every $N^{th}$ number of received packet indications, N being greater than one, said duplicate ACKs provided every $N^{th}$ number of received packet indications including selective acknowledgment (SACK) information on packets received; wherein M equals 3.

10. The method of claim 9, wherein said M duplicate ACKs include SACK information.

11. A method comprising: transmitting a sequence of transmission control protocol (TCP) packets; receiving duplicate acknowledgements (ACKs) for a missing given packet; retransmitting said missing given packet after said given packet has been indicated missing by three duplicate ACKs; only after receiving three duplicate ACKs thereafter receiving duplicate ACKs with selective acknowledgment (SACK) information every $N^{th}$ number of received packets after the successful receipt of a first number of packets after said missing packet, said SACK information including packets received: after receiving duplicate ACKs with SACK information every $N^{th}$ number of received packets thereafter receiving an ACK including said missing packet; and inflating the congestion window by the size of packets received and reducing the congestion window size when said missing packet is received.

12. The method of claim 11, wherein the congestion window inflation is started on the first duplicate ACK after the third duplicate ACK.

* * * * *